(12) United States Patent
Pereira et al.

(10) Patent No.: US 10,922,484 B1
(45) Date of Patent: Feb. 16, 2021

(54) ERROR DETECTION IN HUMAN VOICE RECORDINGS OF MANUSCRIPTS

(71) Applicant: Amazon Technologies, Inc., Seattle, WA (US)

(72) Inventors: Mark Pereira, Grand Haven, MI (US); Matthew Christilaw, Grand Haven, MI (US); Brian Pepera, Grand Rapids, MI (US); Bradley Hill, Jenison, MI (US); Bridgette Oakes, Muskegon, MI (US); Lawrence William McKay, III, Grand Rapids, MI (US); Addam Kearney, Grand Haven, MI (US)

(73) Assignee: Amazon Technologies, Inc., Seattle, WA (US)

( * ) Notice: Subject to any disclaimer, the term of this patent is extended or adjusted under 35 U.S.C. 154(b) by 247 days.

(21) Appl. No.: 16/022,382

(22) Filed: Jun. 28, 2018

(51) Int. Cl.
| | |
|---|---|
| G10L 15/00 | (2013.01) |
| G06F 40/194 | (2020.01) |
| G10L 15/26 | (2006.01) |
| G06F 3/0481 | (2013.01) |
| G10L 15/06 | (2013.01) |
| G06F 16/683 | (2019.01) |
| G10L 15/22 | (2006.01) |

(52) U.S. Cl.
CPC .......... *G06F 40/194* (2020.01); *G06F 3/0481* (2013.01); *G10L 15/26* (2013.01); *G06F 16/685* (2019.01); *G10L 15/063* (2013.01); *G10L 15/22* (2013.01)

(58) Field of Classification Search
CPC combination set(s) only.
See application file for complete search history.

(56) References Cited

U.S. PATENT DOCUMENTS

| | | | |
|---|---|---|---|
| 8,548,618 B1 * | 10/2013 | Story, Jr. .............. | H04N 21/439 700/94 |
| 2014/0088962 A1 * | 3/2014 | Corfield .................. | G10L 15/26 704/235 |
| 2018/0053510 A1 * | 2/2018 | Kofman ................. | G10L 15/265 |

* cited by examiner

*Primary Examiner* — Vu B Hang
(74) *Attorney, Agent, or Firm* — Lee & Hayes, P.C.

(57) ABSTRACT

An audiobook quality control system may detect and flag errors in human voice recordings of manuscripts at real-time or near real-time. The system may receive a manuscript and process the manuscript to generate a comparison document. The system may receive audio data from a recording session and may use a speech-to-text transcription tool to generate transcribed audio. Based on comparing the transcribed audio to the comparison document, the system may flag differences as errors. Additionally, the system may flag common recording errors (e.g., consistency, pronunciation, spacing issue, noise, wrong words, etc.). Based on the error types and number of errors, the system may determine to re-record specific sections of the manuscript.

20 Claims, 8 Drawing Sheets

FIG. 5

| Script | Transcribed |
|---|---|
| The artist is the creator of beautiful things. To reveal art and conceal the artist is art's aim. The critic is he who can translate into another manner or a new material his impression of beautiful things. | the artist is the creature of beautiful things to reveal art and conceal the artist is arts aim the critic is he who can translate into another manner or a new material his impression of beautiful things |
| The highest as the lowest form of criticism is a mode of autobiography. | the highest as the lowest form of criticism is a mode of autobiography |
| Those who find ugly meanings in beautiful things are corrupt without being charming. This is a fault. | those who find ugly meanings in beautiful things are corrupt without being charming this is a fault |
| Those who find beautiful meanings in beautiful things are the cultivated. For these there is hope. | those who find ugly meanings in beautiful things are the cultivated for these there is hope |
| They are the elect to whom beautiful things mean only beauty. | they are the elect to whom beautiful things mean only beauty |
| There is no such thing as a moral or an immoral book. Books are well written, or badly written. That is all. | there is no such thing as a moral or an immoral book books are well written or badly written that is all |
| The nineteenth century dislike of realism is the rage of Caliban seeing his own face in a glass. | the nineteenth century dislike of realism is the rage of caliban seeing his own face in a glass |
| The nineteenth century dislike of romanticism is the rage of Caliban not seeing his own face in a glass. | the nineteenth century dislike of realism is the rage of caliban seeing his own face in a glass |

ERROR DETECTION IN HUMAN VOICE RECORDINGS OF MANUSCRIPTS

BACKGROUND

Due to the popularity of mobile devices and the Internet, audiobooks are benefiting from this popularity and the audiobook industry is experiencing rapid growth. That is because any user carrying a mobile device with Internet access will now be able to easily access a large collection of audiobooks. Audiobooks allow the user to experience a narrative when a physical or e-book would be impossible—for instance, while driving or performing a physical task. Additionally, audiobooks may bring in new customers with reading disability or with no desire to read words on a page. With the growth of the audiobook industry and affordability of quality recording equipment, freelance narrators working offsite or from a home studio are becoming more common.

Although freelance narrators may provide the human voice recordings of manuscripts to help meet the growth demand, such human voice recordings are prone to errors during the performance (e.g., pronunciation, extraneous sounds, etc.) and post-performance (e.g., sound file processing, missing sections of audio, etc.). As such, some of these recordings may result in time-consuming fixes. Accordingly, there is an ongoing need for increasing the efficiency of error detection in human voice recordings of manuscripts.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5 is a schematic diagram showing an example user interface that may be presented to a user to review the text-to-text compare.

DETAILED DESCRIPTION

Figure 1:
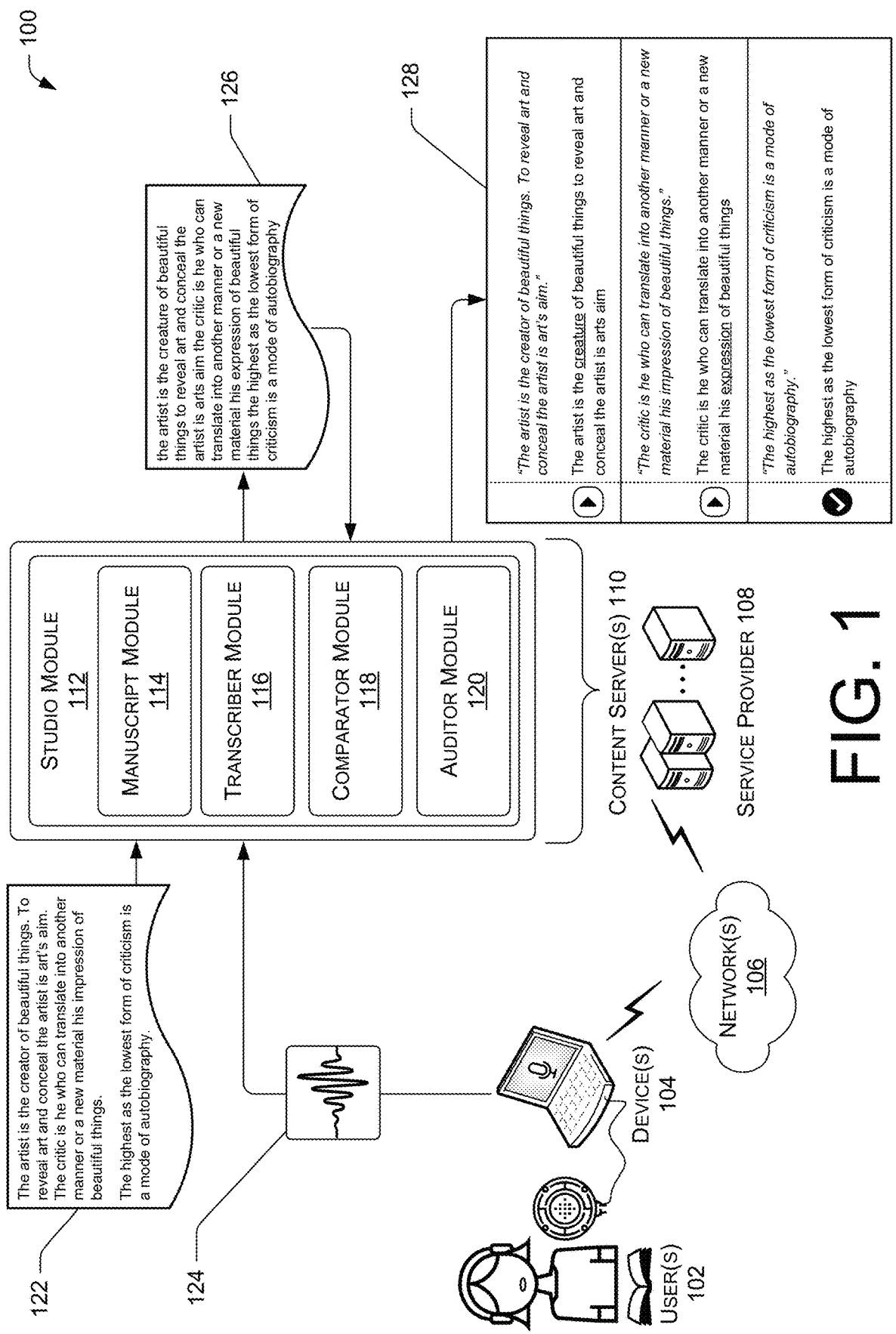
FIG. 1 is a schematic diagram showing an example system of a process for error detection in a voice recording of a manuscript.

This disclosure is directed, in part, to an audiobook quality control system that performs error detection on voice recordings of manuscripts at real-time or near real-time. The system leverages a studio tool that includes a proofing tool that transcribes the recordings into text and compares the text to the manuscript. If there are differences found in comparing the words, the proofing tool may flag the error within the text and provide feedback on the error. Additionally, based on the severity level of the error, the proofing tool may make a recommendation for the narrator to re-record the manuscript section.

This system is able to provide fast auditing of recordings by formatting the manuscript into a simple comparison document, which may have punctuations, line breaks, and/or paragraph breaks removed or ignored. When the system receives audio data, the system performs speech-to-text transcription on the audio data. The words of the transcribed audio are compared to the words of the comparison document, and the differences in words is flagged as errors. By using this system to process the audio data when the data is received, which may be during or after the recording session, the system may quickly flag errors in the recordings before the narrator moves on. That is, rather than wait until the narrator has moved onto reading the next chapter or onto a completely new project, which may change the narrator's reading tone or otherwise cause undue delays, the system may flag errors in the narration data and provide timely feedback on the errors.

Additionally, the system may constantly learn from new audio data and from narration data associated with each narrator. Initially, the system may present a list of calibration words for the narrator to train the transcriber tool. Additionally, the system may process a manuscript to identify special words, or words that are unique to the manuscript but appear with a threshold frequency, and request the narrator to produce training audio data for these special words. The system may learn to improve speech recognition not only by learning from each new audio data that the narrator produces but also by learning from user feedback received by the proofing tools. That is, the proofing tool may present transcribed text that is tagged with errors or defects that the system identifies, then a human user may audit the tags and either accept or reject the tags. The transcribed text that has tags that have been audited by a human user including any rejected false positive errors may be used to train the system to not continuously make the same false positive errors.

This audiobook quality control system may be accessible by narrators (e.g., narrators, performers, actors, writers, etc.) and proofers (e.g., in-house proofing teams, publishers, narrators, etc.) via a web portal or application. The narrator may interact with a narrator tool portion of the studio tool to receive reading assignments. The narrator tool may assign sections of the reading assignment with instructions to read from a specific page or section of a physical manuscript or to read from the manuscript text as displayed in the user interface. Before starting on the actual manuscript recording, the narrator may receive instructions to provider transcription training data by reading special words for the current reading assignment. This transcription training data may be used to train a machine learning model to improve voice recognition for this narrator. Early in the learning phase, the proofing tool may have an error rate than is higher than acceptable for studio standard or threshold and may require more supervision from a human user who is part of the in-house proofing team to identify false positive or missed errors. However, the system learns from more narration data. As the machine learning model receives more narration data and feedback for narrators, the error rate for the proofing tool may improve over time. Accordingly, the system may provide a more accurate voice-to-text and text-to-text comparison, thus requiring less supervision from the proofing team.

The proofers may interact with the proofing tool portion of the audiobook quality control system to receive the transcription of the recording with errors tagged. The proofer may view the tagged files and verify the accuracy of the tags to help determine if certain portions of the manuscript contains too many errors and needs to be re-recorded. Initially, permission to access the proofing tool may be given to registered accounts of the in-house proofing team. In some cases, the narrator's account may also be given permission to access the proofing tool. Such permission may be granted based on the narrator data meeting one or more quality control criteria (e.g., meeting in-house error rates, having a minimum number title published, consistent track record of high quality audio files, etc.). If given access, a narrator may also act as a proofer for the recordings before submitting the audio file to the server. Such narrator-proofed audio files may still be quality checked by a proofing team member based on random selection, narrator data, or other selection criteria.

This audiobook quality control system provides a number of advantages over the traditional audiobook quality control systems, such as allowing faster additions of new stories or manuscripts to the system. This system may be used by the in-house proofing staff to identify possible errors in the recording then listening to the tagged sections instead of listening to the entirety of the recording, thus saving time. Additionally, in situations where the narrator has been given permission to access the proofing tool, the narrator may also use the proofing tool to proof their own work without waiting for feedback from the proofing team.

Moreover, this system's studio tool provides an improvement over how training data is acquired, which may require a narrator to not only record a large library of words to be used as training data but also provide narration data with errors that are manually labeled. By providing the studio tool, the system is able to continuously gather training data and learn from new training data, so that when the proofing tool incorrectly identifies an error in the transcribed text, and a user corrects the mistake, this may be used as training data. The manual proofing of a number of recorded manuscripts and tagging each manuscript is not only time intensive and resource intensive (e.g., higher costs), but scheduling follow-up re-recording is similarly slow and costly. By providing both the narrator tool and auditor tool to some narrators, the training data may be quickly generated by the narrators rather than waiting on the proofing team. Moreover, the narrator tool may provide real-time or near real-time feedback on audio data sound quality, thus notifying the narrator if the sound quality is below threshold quality (e.g., low volume, excessive background noise, distortion in audio, etc.) and saving time from generating unusable audio data. Additionally, the narrators with auditor tool access will be able to see each mistake that they make thus able to adjust any misreads that the narrators may not be normally notified about because the error was not severe enough. Over time, based on the narration data and recordings gathered from the narrator, the system can learn to efficiently and accurately identify errors in recordings and may require only mere confirmation from the proofers. As such, as the system learns, the audiobook proofing process is faster, more efficient, and even more accurate than tagging stories manually.

Moreover, by creating a system that can quickly tag and proof audiobooks for the manuscripts without additional input from in-house proofers, the library of audiobooks may grow more rapidly. This growth allows for greater variety of topics in audiobooks to better engage listeners who may enjoy a different variety of topics. Thus, the present audiobook quality control system provides improvement over traditional audiobook quality control systems by providing a faster, more efficient, and less costly method to produce high quality audiobooks.

The techniques and systems described herein may be implemented in a number of ways. Example implementations are provided below with reference to the following figures.

FIG. 1 is a schematic diagram showing an example system 100 of a process for proofing a voice recording of a manuscript and providing feedback on errors detected in the recording. The system 100 may include user(s) 102 that utilizes device(s) 104, through one or more network(s) 106, to interact with a service provider 108. In some examples, the network(s) 106 may be any type of network known in the art, such as the Internet. Moreover, the service provider 108 and/or the device(s) 104 may communicatively couple to the network(s) 106 in any manner, such as by a wired or wireless connection.

The service provider 108 may be any entity, publisher, server(s), platform, etc., that provides audiobooks and/or studio tools to produce audiobooks to user(s) 102. In some examples, the service provider 108 may provide tools for user(s) 102 to upload manuscripts to be published. The service provider 108 may provide narrator tools for user(s) 102 to receive reading tasks and to upload narrator data. Additionally, the service provider 108 may provide proofing tools for user(s) 102 to proof voice recordings of manuscripts. As shown, the service provider 108 may include one or more content server(s) 110. The content server(s) 110 may be implemented in a non-distributed computing environment or may be implemented in a distributed computing environment, possibly by running one or more modules on device(s) 104 or other remotely located devices. The content server(s) 110 may be any type of server, such as a network-accessible server.

In various examples, the service provider 108 may present the manuscripts and audiobooks on behalf of the user(s) 102, educational services, and/or entities. In at least one example, the service provider 108 described herein may cause one or more user interfaces to be presented to user(s) 102 via device(s) 104. The user interface(s) may allow the user(s) 102 to create user or narrator accounts to access the system, among other possible uses.

In some examples, the service provider 108 may include the manuscript module 114 to allow user(s) 102 to submit manuscripts (e.g., fiction, non-fiction, memoirs, essays, etc.) to the system. The manuscript module 114 may parse the submitted manuscripts and break the manuscript into logical chunks where a pause may naturally occur during reading.

The user(s) 102 (e.g., narrators, performers, authors, publishers, educators, writers, proofers, in-house studio team, etc.) may interact with the service provider 108 via a site (i.e., a website), a studio application, a self-service interface, a self-service portal, or in any other manner.

The user(s) 102 may use the studio module 112 to interact with the service provider 108. In various examples, the user(s) 102 may be any individuals, agents, authors, writers, staff, or entities that are publishers of stories, reading content, or manuscripts. For instance, the user(s) 102 may include entities such as publishers with multiple writers and staff members registered to add and/or edit content under one or more accounts associated with the entity. Additionally, the user(s) 102 do not have to contribute their own stories or reading content, but rather, the user(s) 102 may be any narrator, voice actor, or performer who may receive narrating assignments from the service provider 108 and who may or may not receive compensation to provide audio recordings for the narrating assignments. The studio module 112 and associated components may prompt the user(s) 102 to provide voice recordings of manuscripts. For the purpose of this discussion, such user interfaces are referred to herein as an "narrator UI." The narrator UI may display instructions associated with a current narrating assignment for the user(s) 102 to prompt recording of the audio data. The instructions may include the text of a portion of manuscript or instructions to turn to a certain page of a manuscript. The narrator UI may allow the user(s) 102 to provide the audio data and may display instructions to re-record portions of a narrating assignment due to defects found in the audio data, as illustrated and discussed in FIG. 7, below.

The user(s) 102 may interact with the service provider 108 to receive the manuscript, the audio data, and the tagged transcription to identify and verify the errors detected using an auditor module 120. The auditor module 120 may generate and present user interfaces to prompt the user(s) 102 to verify errors detected in voice recordings of manuscripts. For the purpose of this discussion, such user interfaces are referred to herein as an "auditor UI." The auditor UI may display portions of the manuscripts and corresponding transcribed audio data with errors tagged to allow a proofer to review defective sections and may allow the proofer to verify if the errors are tagged correctly, as illustrated and discussed in FIGS. 5 and 6, below.

In some examples, the user(s) 102 may operate corresponding device(s) 104 to perform various functions associated with the device(s) 104, which may include at least some of the operations and/or modules discussed above with respect to the service provider 108. The user(s) 102 may operate device(s) 104 using any input/output devices including but not limited to mouse, monitors, displays, augmented glasses, keyboard, cameras, microphones, speakers, and headsets.

In at least one configuration, the content server(s) 110 may include any components that may be used to facilitate interaction between the service provider 108 and the device(s) 104. For example, the content server(s) 110 may include a studio module 112 and associated components.

The studio module 112 may include the manuscript module 114, the transcriber module 116, the comparator module 118, and the auditor module 120. The studio module 112 may interact with different types of user(s) 102 (e.g., publishers, narrators, proofers, etc.) and allow the user(s) 102 to access to studio tools based on the permission granted to the user account. For instance, the studio module 112 may grant access to the publishing tool for publishers to upload manuscripts, the narrator tool for narrators to provide voice recordings, and the auditor tool for proofers to audit recordings of manuscripts. In various examples, the user(s) 102 may be multiple user types including publisher, narrator, and proofer, and the studio module 112 may allow the user(s) 102 access based on permission granted on the user account.

The manuscript module 114 may receive manuscripts from the user(s) 102 (e.g., authors, writers, teachers, publishers, etc.). The manuscripts may be any type of voice recordable content including books, stories, articles, reports, reading content, etc. The manuscript module 114 may analyze the manuscript to break the content into chunks and generate a comparison document. The breaks in content may be based on any natural breaks or reading pauses in a manuscript (e.g., paragraph ending, chapter ending, change in story setting, change in timeline, etc.). The manuscript module 114 may format the manuscripts into a comparison document without line breaks, paragraph breaks, or punctuations. The comparison document may be used by the comparator module 118 to provide the text for a quick text-to-text compare.

The transcriber module 116 may transcribe audio data into text for comparing with the comparison document to highlight errors. In various examples, the transcriber module 116 may receive voice recording data from user(s) 102 and may analyze the manuscript to identify special words to be used as training words. Before transcribing audio data of the manuscript, the transcriber module 116 may prompt the user(s) 102 to provide transcription training data by recording special words associated with the current reading assignment. This transcription training data may be used to train a machine learning model to improve voice recognition for the transcriber module 116. The transcriber module 116 may convert the audio recording of the manuscript using a speech-to-text conversion engine with natural language processing to further understand hard-to-process words not in the engine.

The comparator module 118 may interact with the manuscript module 114 to receive a comparison document of the manuscript and the transcriber module 116 to receive the transcribed audio. The comparator module 118 may find differences between the transcribed audio and the comparison document, and mark the differences in the transcribed audio as defects.

The auditor module 120 may interact with the manuscript module 114 and the comparator module 118 to receive the original manuscript and the tagged transcribed audio. In various examples, the auditor module 120 may present the original manuscript and the tagged transcribed audio next to each other to help the proofer verify the defect. In some examples, the auditor module 120 may present audio tools for a proofer to listen to the audio data to better verify the defect and may present editing tools to accept or reject the defect tags.

As a non-limiting example, the example system 100 may illustrate an exemplary process of the studio module 112 receiving an example manuscript 122, receiving example audio data 124, and processing the example audio data 124 to detect error(s) in the recording. Initially, the manuscript module 114 may receive and process the example manuscript 122 into a comparison document. Although not illustrated, the studio module 112 may send the example manuscript 122 to the user 102 as the narrating assignment. In response to receiving the narrating assignment, the user 102 may proceed to record the example audio data 124. The transcriber module 116 may receive the example audio data 124 and generate the example transcribed audio 126. The comparator module 118 may interact with the manuscript module 114 to receive the comparison document and the transcriber module 116 to receive the example transcribed audio 126. The comparator module 118 may compare the comparison document to the example transcribed audio 126 and tag errors or differences found in the example transcribed audio 126. Finally, the auditor module 120 may present the errors found in the example user interface 128 for a proofer to verify the errors. The proofer may be an in-house proof team member or the narrator.

Figure 2:
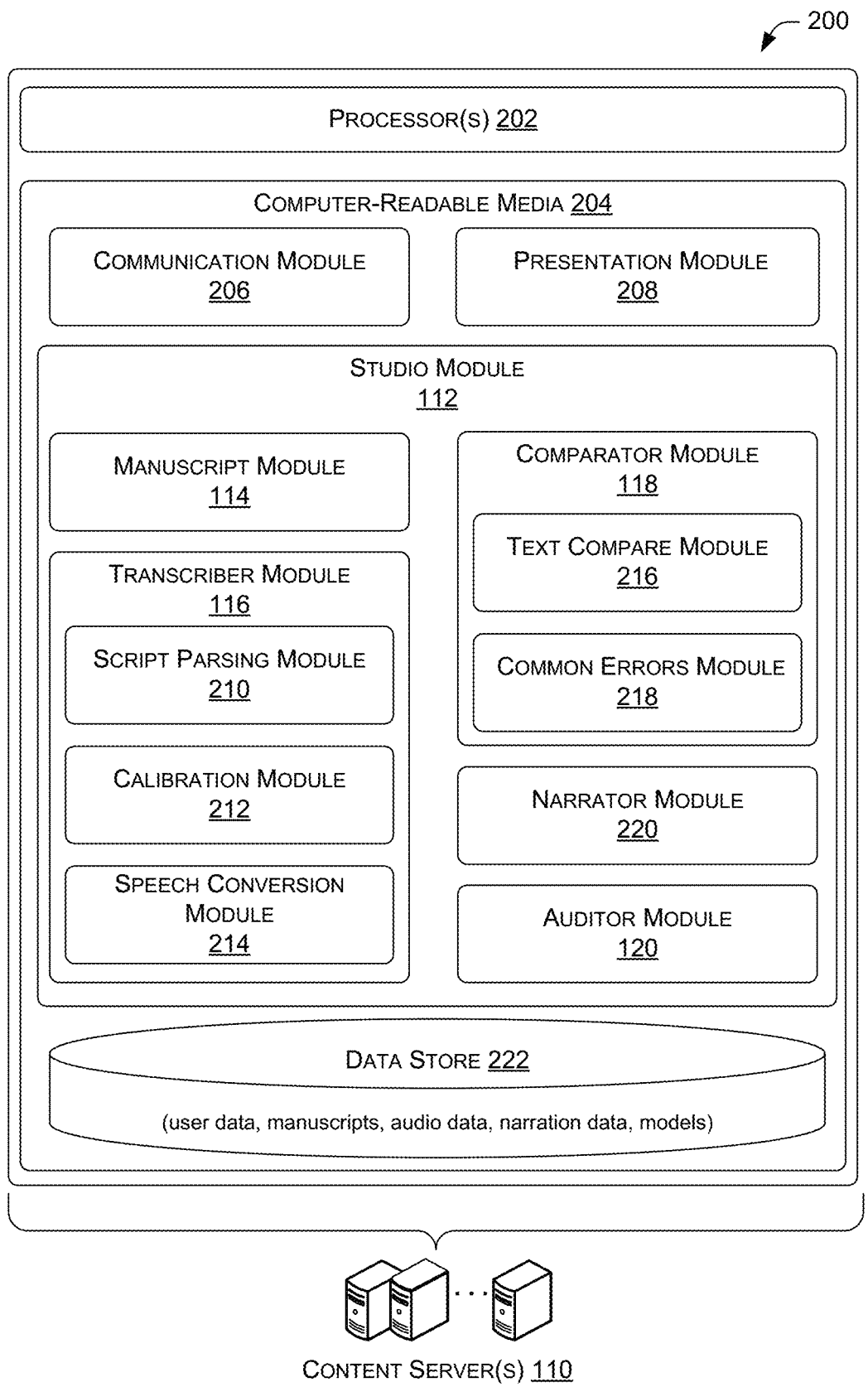
FIG. 2 is a block diagram of an illustrative computing architecture of an audiobook quality control system.

FIG. 2 is a block diagram of an illustrative computing architecture 200 of the content server(s) 110. The computing architecture 200 may be implemented in a distributed or non-distributed computing environment.

The computing architecture 200 may include one or more processor(s) 202 and one or more computer-readable media 204 that stores various modules, data structures, applications, programs, or other data. The computer-readable media 204 may include instructions that, when executed by the one or more processor(s) 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some embodiments, the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

In some embodiments, the computer-readable media 204 may store the communication module 206, the presentation module 208, the studio module 112 and associated components, and the data store 222, which are described in turn. The components may be stored together or in a distributed arrangement.

The communication module 206 may facilitate communication between the user(s) 102 and the service provider 108. The communication module 206 may present various user interfaces to communicate with the user(s) 102. In various examples, the communication module 206 may present the user interfaces allowing the user(s) 102 to create different types of user accounts (e.g., publisher, narrator, proofer, etc.) with the service provider 108. In at least one example, the communication module 206 may receive information associated with user(s) 102 with a publisher account such as user information (e.g., financial account(s), personnel count, business type, entity size, location, etc.) and actions associated with a publisher account for the user(s) 102 (e.g., submissions, sales, history, business needs, etc.). In various examples, the communication module 206 may receive information associated with user(s) 102 having a narrator account type such as narrator information (e.g., financial accounts(s), story type preference, accents, voice acting skills, recording hardware, location, etc.) and actions associated with the narrator account for the user(s) 102 (e.g., publishing history, error rate, recording quality, etc.). In an additional example, the communication module 206 may receive information associated with user(s) 102 having a proofer account type, although in some cases, the proofer may be part of an in-house proofing team and may be required to provide less information, such as proofer information (e.g., story type preference, location, experience, etc.) and actions associated with the proofer account for the user(s) 102 (e.g., proofing history, error rate, etc.).

The presentation module 208 may interact with the studio module 112 to present one or more user interface associated with tools for the studio module 112 and associated components. In various examples, the presentation module 208 may interact with the narrator module 220 to provide a narrator UI for the user(s) 102 to receive narrating assignments. In some examples, the presentation module 208 may interact with the auditor module 120 to provide an auditor UI for the user(s) 102 to receive tagged transcribed text for proofing.

The studio module 112 may include the manuscript module 114, the transcriber module 116 and associated components, the comparator module 118 and associated components, the narrator module 220, and the auditor module 120. The audiobook quality control system's goal is to learn how to efficiently produce an error-free audiobook. To this end, the studio module 112 may leverage its components and models in the data store 222 to build and evolve the system's machine learning model for speech recognition and error detection. The studio module 112 may collect data associated with user(s) 102 from various sources and retrieve user data as needed by the modules, including data specific to the user account including tools permission (e.g., publisher tool, narrator tool, auditor tool, etc.), personal user data (e.g., age, gender, preferences, accents, etc.), and user specific training data (e.g., calibration data, special words data, and narrator data). In various examples, the studio module 112 and/or one or more associated components may be part of a standalone application that may be installed and stored on the user device(s) 104.

The manuscript module 114 may receive and process manuscripts. The manuscripts may be any type of voice recordable content (e.g., books, stories, articles, reports, reading content, etc.) and may be in any format (e.g., eBooks, scanned manuscripts, documents, text files, etc.). The manuscript module 114 may analyze the manuscript to break the content into chunks and generate a comparison document. The breaks in content may be based on any natural breaks or reading pauses in a manuscript (e.g., paragraph ending, chapter ending, change in story setting, change in timeline, etc.). In various examples, the manuscript module 114 may format the manuscripts into the comparison document without line breaks, paragraph breaks, or punctuations to provide the plain text for a quick text-to-text compare. In some examples, the manuscript module 114 may perform a spelling and grammar check and flag typos for manuscript fix.

The transcriber module 116 may include the script parsing module 210, the calibration module 212, and the speech conversion module 214. The transcriber module 116 may transcribe audio data into text for comparing with the comparison document generated by the manuscript module 114 to identify differences to tag as errors.

The script parsing module 210 may parse the manuscript and identify special words in the text of the manuscript. Initially, the script parsing module 210 may analyze the manuscript to identify special words, or words that are unique to the manuscript, thus not words already recorded as part of the general list of calibrating words. Special words may be identified based on appearing above a threshold frequency in the text of the manuscript, such as a predetermined minimum number of appearances in the manuscript, or based on identifying a predetermined top percentage or top number of a unique word list that is ranked by appearances count. In at least some examples, the script parsing module 210 may maintain a list of special words that have been recorded and will filter out special words that have been recorded.

The calibration module 212 may prompt the user(s) 102 to provide transcription training data. Initially, the calibration module 212 may prompt the user(s) 102 to calibrate the speech-to-text, or speech recognition, algorithm by prompting the user(s) 102 to record a list of calibrating words. This list of calibrating words may be used to train a machine learning model to improve voice and speech recognition for the transcriber module 116. The calibrating words may include a list of commonly used words (e.g., pronouns) and words that the speech recognition algorithm may have identified as being difficult to recognize. Additionally, before transcribing audio data of the manuscript, the calibration module 212 may prompt the user(s) 102 to provide manuscript specific training data by recording special words associated with the current reading assignment. This manuscript specific training data may be added as training data to further train the machine learning model to improve voice recognition. The special words data may be stored for the user(s) 102 and the calibration module 212 may determine to skip this process if all special words have already been recorded and stored.

The speech conversion module 214 may use the system model and audio data generated by the calibration module 212 to convert speech to text. Initially, the early speech conversion module 214 may perform speech-to-text conversion using generic system model and audio data generated by the calibration module 212, then combining natural language parsing and classification to identify speech as words. The natural language parsing may use one or more natural language and homonym libraries. As the studio module 112 produce more tagged and proofed versions of narration data associated with specific user(s) 102, the system model may learn from the narrator specific narration data for particular words. The narration data may include any data generated by the studio module 112 for a particular manuscript as part of the narrating and proofing process, including, but not limited to, the original manuscript file, the audio data, any revised audio data, the transcribed text file, the tagged defects, the typos identified in the manuscript, and the accepted and/or rejected tags.

Accordingly, the studio module 112 may use any portion of the tagged and proofed narrator data submitted by the user(s) 102 as input to train one or more of machine learning models stored in the data store 222. Machine learning generally involves processing a set of examples (called "training data") in order to train a machine learning model(s). A machine learning model, once trained, is a learned mechanism that can receive new data as input and estimate or predict a result as output. For example, a trained machine learning model can include a classifier that is tasked with classifying unknown input (e.g., an unknown image) as one of multiple class labels (e.g., labeling the image as a cat or a dog). In the context of the present disclosure, the unknown audio may include, inter alia, audio recordings for manuscripts that needs proofing, and the trained machine learning model, or the system models, may be tasked with classifying the unknown audio as one of multiple class labels. The class labels, in this case, may correspond to a classification of the unknown audio as a type of speech among multiple different types of speech corresponding to different words or text.

The machine learning model(s) may represent a single model or an ensemble of base-level machine learning models, and may be implemented as any type of machine learning model. For example, suitable machine learning models for use with the techniques and systems described herein include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of models, as stored in the data store 222, whose outputs (classifications) are combined, such as by using weighted averaging or voting. The individual machine learning models of an ensemble can differ in their expertise, and the ensemble can operate as a committee of individual machine learning models that is collectively "smarter" than any individual machine learning model of the ensemble. In various examples, the studio module 112 may train additional system models to classify the manuscripts based on story genres (e.g., adventure, action, comedy, crime, mystery, science fiction, etc.) and process the audio data based on the classification depending on the genre, the audio data may include intentional long pauses, volume change, or tone shift for dramatic effects.

The comparator module 118 may include the text compare module 216 and the common errors module 218. The comparator module 118 may flag not only fatal flaws, or any large sections of omitted, added, repeated, or out-of-order content, but also common errors (e.g., consistency, pronunciation, spacing issue, noise, wrong word, etc.).

In some examples, the comparator module 118 may determine the level of defects for a particular recorded section or session based on the number of errors and the type of errors. Certain error types may increase the weight of the error in determining the level of defects. For instance, an incorrect pronunciation of the name of a character may weigh more heavily than an incorrect pronunciation of an adjective. Thus, the level of defects based on two instances of mispronunciation of character names may be higher than four instances of mispronunciation of adjectives. In an additional example, the comparator module 118 may determine that one or two common errors are minor to moderate errors and may not rise to a level of severity for re-recording. That is, the comparator module 118 may recommend accepting the recording with the one or two common errors, based on the level of defect in the recording being within a threshold margin of error. In various examples, the comparator module 118 may determine that the level of defects associated with errors is below the threshold margin of error for re-recording and may provide the recommendation accordingly. The recommendation may be indicated in either the narrator or auditor tool.

In various examples, the comparator module 118 may interact with a narrator or auditor tool to replace a particular defective section of a prior recording and receive a revised recording to be inserted. If the comparator module 118 determines that the volume and tone of the revised recording is within an accepted degree of similarity to the portions of the recording before and after the particular defective section, then the revised recording may be inserted into the particular section of the prior recording. If the comparator module 118 determines the revised recording is defective based on the volume, tone, or other reasons, the comparator module 118 may determine to request another re-recording.

The text compare module 216 may interact with the manuscript module 114 and the transcriber module 116 to receive comparison documents and transcribed audio. The text compare module 216 may compare the comparison document of the manuscript with the transcribed audio to identify differences and mark the differences in the transcribed audio file as defects. In some examples, the original manuscript may include one or more typos in the words, and the text compare module 216 may flag the correctly pronounced word as a defect or as a review item. If this typo has already been identified by the manuscript module 114 during the spelling and grammar check and flagged for manuscript fix, the text compare module 216 may flag the difference as a review item for the proofer to review. Otherwise, the text compare module 216 may flag this as a defect for the proofing process to fix. In an additional or alternate example, the text compare module 216 may use one or more homonym libraries to determine that the audio data matches the text in the manuscript and may determine to not flag the difference as a defect but rather flag the difference as a review item for the proofer to further analyze. The sections flagged as a review item may still pass audio check, but may indicate an error in the text of the manuscript.

The common errors module 218 may perform a general quality audit and determine if there are common errors in the audio data. The common errors module 218 may determine the level of defects in common errors for a particular recorded selection or a particular recording session. Based on the error type and number of errors found, if the common errors module 218 determines that the level of defects in the errors exceeds a threshold margin of error, a full audit of the recording may be triggered. Certain error types may increase the weight of the error in determining the level of defects. In some examples, the common errors module 218 may analyze the audio stream as it is being received. Based on the analysis, if the common errors module 218 determines that the level of defects in the audio quality (e.g., excessive background noise, low or no volume, distortion in audio, etc.) is below a threshold audio quality, the common errors module 218 may generate an alert to stop the current recording session and start the recording session all over again.

As a non-limiting example, the common errors module 218 may determine the level of defects and determine whether the level of defects exceeds a threshold margin of error based on the error types and number of errors using the following example threshold table:

| Error Type | Notes | Number of Errors Found | Audit Fail |
|---|---|---|---|
| Consistency | Proper nouns, public figures, character names, locations, businesses, products | 1 or more | Yes |
| Pronunciation | Proper nouns, public figures, character names, locations, businesses, products | 1 or more | Yes |
| Spacing Issue | 3 seconds or longer | 1 or more | Yes |
| Wrong Word | | 5 or more | Yes |
| Noise | Severe, such as distorted audio or background noise | 2 or more | Yes |
| Volume and Tone | Severe volume or tone change, too low or no volume | 4 or more | Yes |

In the present example, using the example threshold table, the number of errors found may be measured within a particular recording session or a timed segment (e.g., errors per 30 minutes of recording). For instance, a threshold margin of error for incorrect words may be 5 or more incorrect words for the current recording session.

The narrator module 220 may interact with the presentation module 208 to provide a narrator user interface (UI) for the narrator to receive narrating assignment. The narrator may use the recording tool provided with the narrator UI to record the manuscript, or may use another audio tool for recording, then upload the audio data from the narrator UI. When the narrator is done with the recording process, the narrator may indicate so by stopping the recording session or by selecting the audio data upload option from the narrator UI.

In some examples, the narrator module 220 may interact with the comparator module 118 to provide real-time or near real-time feedback on the audio data during the recording session. For instance, if the narrator uses the recording tool provided with the narrator UI to record the manuscript, the comparator module 118 may analyze the audio stream as it is being received. Based on the analysis, if the comparator module 118 determines that the level of defects in the audio quality (e.g., excessive background noise, low or no volume, distortion in audio, etc.) is below a threshold audio quality, the narrator module 220 may alert the narrator to stop the current recording session and start the recording session all over again.

In various examples, the narrator module 220 may transmit the recording to the content server(s) 110 for the proofing process. In additional or alternative example, the narrator module 220 may interact with the auditor module 120 to perform the proofing process. If the proofing process determines that a particular section of the recording has a level of defects that meets the severity threshold, the narrator module 220 may prompt the narrator to re-record that particular section. In some examples, the narrator module 220 may provide the audio data recorded for the section that proceeds the particular section for the user(s) 102 to listen to. This may allow the user(s) 102 to match the volume and tone when re-recording the particular section. In various examples, the narrator module 220 may receive the revised recording and may interact with the comparator module 118 to determine that the tone for the revised recording matches the tone in the audio portions before and after the particular section. If the comparator module 118 determines that the volume and tone of the revised recording matches within a threshold degree of similarity, then the revised recording may be inserted into the particular section of the recording. If the comparator module 118 determines the revised recording is defective for volume, tone, or another reason, the narrator module 220 may present the error in the revised recording and request another re-recording.

In an additional or alternative example, the narrator module 220 may include a stitching tool for inserting a revised recording. If the comparator module 118 determines the revised recording is defective for minor volume or tone differences, the narrator module 220 may include an auto-tuning option that may make small adjustments to the revised recording. Accordingly, if the comparator module 118 determines that the volume and tone of the auto-tuned revised recording matches within a threshold degree of similarity, then the auto-tuned revised recording may be inserted into the particular section of the recording.

The auditor module 120 may interact with the manuscript module 114 and the comparator module 118 to receive the original manuscript and the tagged transcribed audio. In various examples, the auditor module 120 may interact with the presentation module 208 to present the tagged transcribed audio to the proofer via an auditor UI. The auditor module 120 may present the original manuscript and the tagged transcribed audio next to each other to help the proofer verify the defect. In some examples, the auditor module 120 may present one or more audio controls for a proofer to listen to the audio data to verify the errors and may present editing tools to accept or reject the error tags. If the auditor module 120 receives input from user to a reject false positive error, the associated narration data may be marked as having a false positive error may be stored in data store 222 to be used to train the system to not continuously make the same false positive error.

In some examples, the auditor module 120 may flag typos in the manuscript. As discussed above, the manuscript module 114 may flag typos during the spelling and grammar check, however, this may fail to catch flag all typos. The text compare module 216 may flag the typo as a recording defect or as a review item based on identifying differences in words, a proofer using the auditor module 120 may flag the recorded word as non-defective and flag the typo in the manuscript.

The data store 222 may store at least some data including, but not limited to, data collected from the communication module 206, the presentation module 208, and the studio module 112 and associated components, including data associated with user profiles, user information, stories, and images. In an example, the data may be automatically added via a computing device (e.g., content server(s) 110). User profile(s) may correspond to one or more user profiles associated with the service provider 108. In various examples, a user profile may include information associated with the user(s) 102 such as user skill as a narrator and/r proofer.

Figure 3:
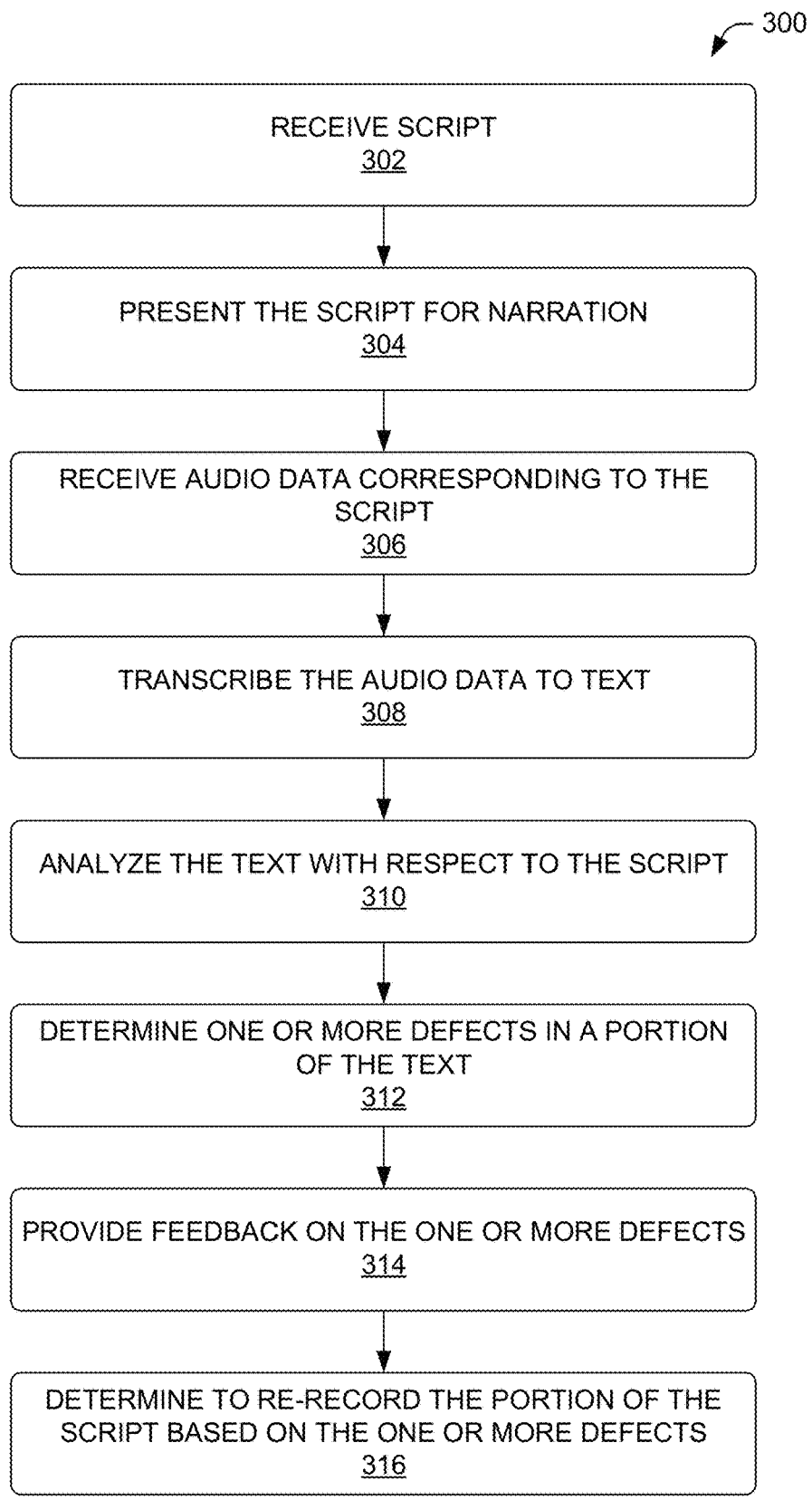
FIG. 3 is a flow diagram of an illustrative process for performing error detection in human voice recordings from manuscripts.
Figure 4:
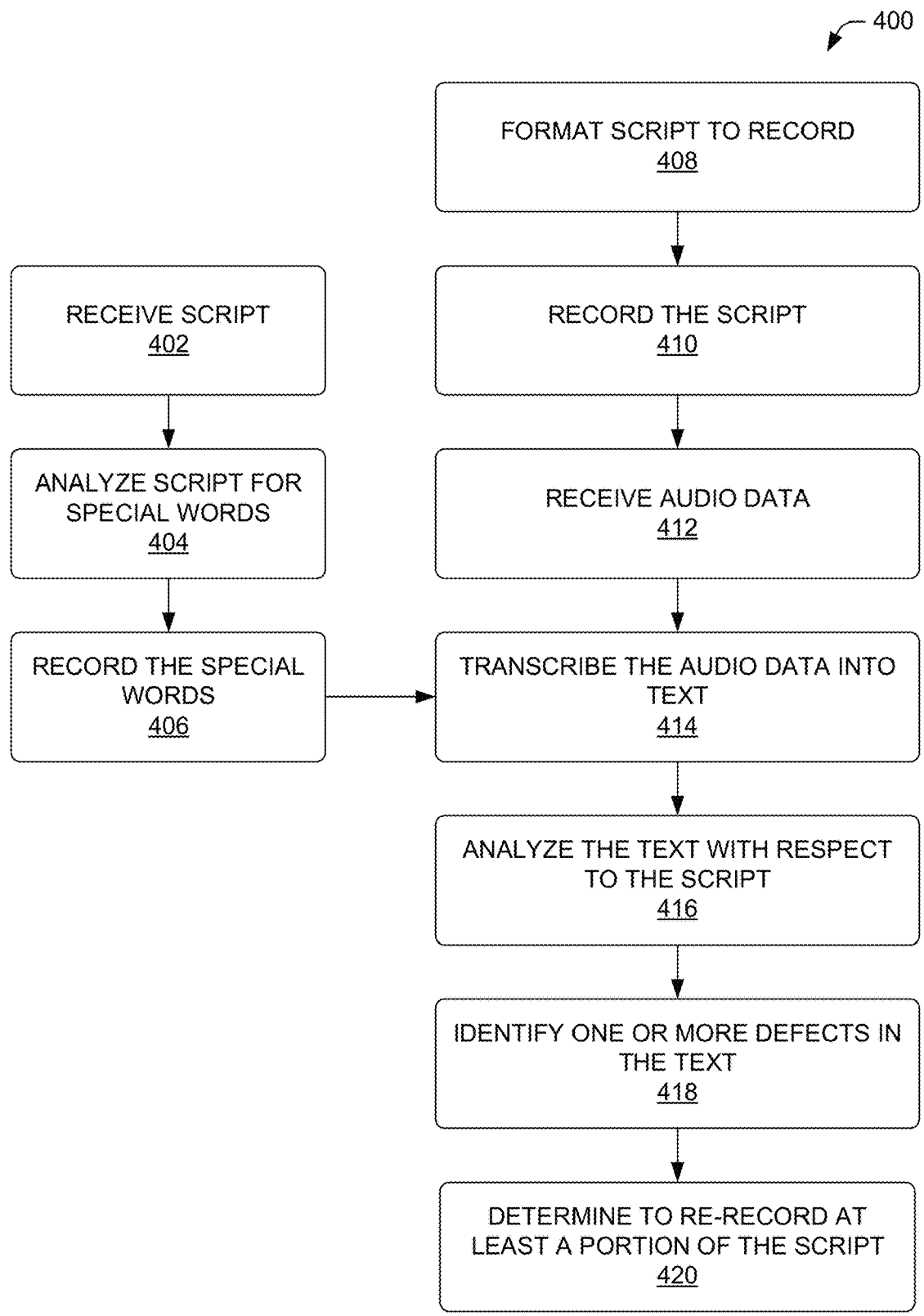
FIG. 4 is a flow diagram of an illustrative process for training the system for voice recognition and performing error detection in audio data associated with the manuscript.
Figure 8:
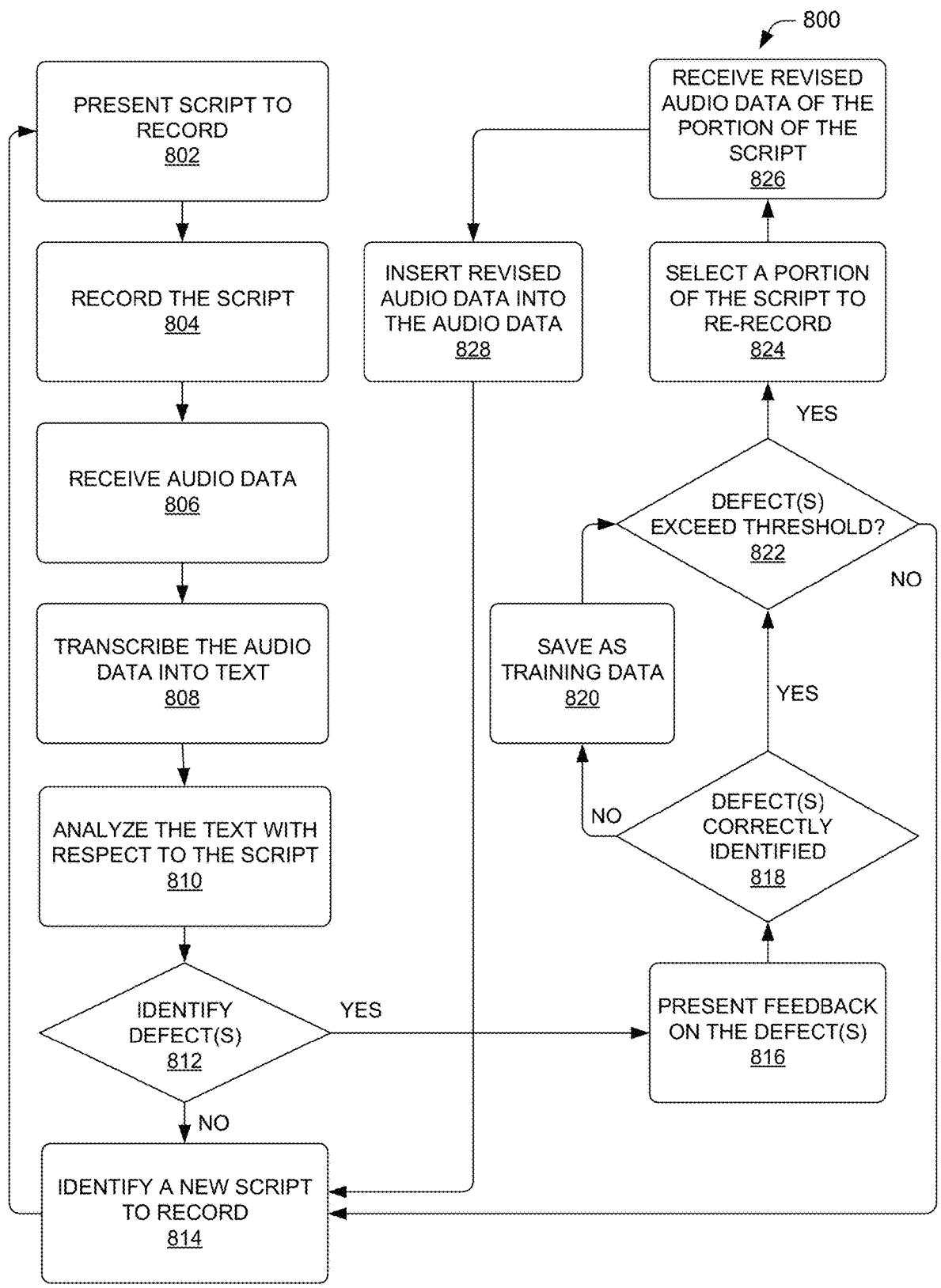
FIG. 8 is a flow diagram of an illustrative process for the continuous feedback loop of presenting a script to record, performing error detection in audio data associated with the script, and determining whether to move onto new script or re-record the script based on defect.

FIGS. 3, 4, and 8 are flow diagrams of illustrative processes. The example processes are described in the context of the environment of FIG. 2, but are not limited to that environment. The processes are illustrated as a collection of blocks in a logical flow graph, which represents a sequence of operations that can be implemented in hardware, software, or a combination thereof. In the context of software, the blocks represent computer-executable instructions stored on one or more computer-readable media 204 that, when executed by one or more processor(s) 202, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 3 is a flow diagram of illustrative process 300 for performing error detection in human voice recordings received from user(s) 102 of a manuscript. The process 300 is described with reference to the system 100 and may be performed by the user device(s) 104 and/or in cooperation with any one or more of the content server(s) 110. Of course, the process 300 (and other processes described herein) may be performed in other similar and/or different environments.

At 302, the manuscript module 114 may receive a script for narration. The manuscripts may be any type of voice recordable content (e.g., books, stories, articles, reports, reading content, etc.) and may be in any format (e.g., eBooks, scanned manuscripts, documents, text files, etc.).

At 304, the manuscript module 114 may format the script to generate a comparison document. The manuscript module 114 may analyze the manuscript to break the content into chunks and generate a comparison document. The breaks in content may be based on any natural breaks or reading pauses in a manuscript (e.g., paragraph ending, chapter ending, change in story setting, change in timeline, etc.). The manuscript module 114 may format the manuscripts into a comparison document without line breaks, paragraph breaks, or punctuations to provide the plain text for a quick text-to-text compare.

At 306, the transcriber module 116 may receive audio data corresponding to the script. The transcriber module 116 may receive and transcribe audio data into text for comparing with the comparison document generated by the manuscript module 114 to identify differences in words. The script parsing module 210 may parse the manuscript and identify special words. Initially, the script parsing module 210 may analyze the manuscript to identify special words, or words that are unique to the manuscript, thus not words already recorded as part of the general list of calibrating words. Special words may be identified based on appearing above a threshold frequency in the text of the manuscript, such as a predetermined minimum number of appearances in the manuscript, or based on identifying a predetermined top percentage or top number of a unique word list that is ranked by appearances count. In at least some examples, the script parsing module 210 may maintain a list of special words that have been recorded and will filter out special words that have been recorded.

At 308, the transcriber module 116 may transcribe the audio data to text. The speech conversion module 214 may use the system model and audio data generated by the calibration module 212 to convert speech to text. Initially, the early speech conversion module 214 may perform speech-to-text conversion using generic system model and audio data generated by the calibration module 212, then combining natural language parsing and classification to identify speech as words. The natural language parsing may use one or more natural language and homonym libraries. As the studio module 112 produce more tagged and proofed versions of narration data associated with specific user(s) 102, the system model may learn from the narrator specific narration data for particular words.

At 310, the text compare module 216 may analyze the text with respect to the script. The text compare module 216 may interact with the manuscript module 114 and the transcriber module 116 to receive comparison documents and transcribed audio. The text compare module 216 may compare the comparison document of the manuscript with the transcribed audio to identify differences and mark the differences in the transcribed audio file as defects.

At 312, the comparator module 118 may determine one or more defects in a portion of the script. The comparator module 118 may include the text compare module 216 and the common errors module 218. The comparator module 118 may flag not only fatal flaws, or any large sections of omitted, added, repeated, or out-of-order content, but also common errors (e.g., consistency, pronunciation, spacing issue, noise, wrong word, etc.). In some examples, the comparator module 118 may determine the level of defects for a particular recorded section or session based on the number of errors and the type of errors. Certain error types may increase the weight of the error in determining the level of defects. For instance, an incorrect pronunciation of the name of a character may weigh more heavily than an incorrect pronunciation of an adjective. Thus, the level of defects based on two instances of mispronunciation of character names may be higher than four instances of mispronunciation of adjectives. In an additional example, the comparator module 118 may determine that one or two common errors are minor to moderate errors and may not rise to a level of severity for re-recording. That is, the comparator module 118 may recommend accepting the recording with the one or two common errors, based on the level of defect in the recording being within a threshold margin of error. In various examples, the comparator module 118 may determine that the level of defects associated with errors is below the threshold margin of error for re-recording and may provide the recommendation accordingly. The recommendation may be indicated in either the narrator or auditor tool.

At 314, the auditor module 120 may provide feedback on the one or more defects. The auditor module 120 may interact with the manuscript module 114 and the comparator module 118 to receive the original manuscript and the tagged transcribed audio. In various examples, the auditor module 120 may interact with the presentation module 208 to present the tagged transcribed audio to the proofer via an auditor UI. The auditor module 120 may present the original manuscript and the tagged transcribed audio next to each other to help the proofer verify the defect. In some examples, the auditor module 120 may present one or more audio controls for a proofer to listen to the audio data to verify the errors and may present editing tools to accept or reject the error tags.

At 316, the comparator module 118 may determine to re-record the portion of the script based on the one or more defects. In various examples, the comparator module 118 may determine that the errors are does rise to level of severity for re-recording and may provide the recommendation. This may be indicated in either the narrator or auditor tool. If the proofing process determines that a particular section of the recording has a level of defects that meets the severity threshold, the narrator module 220 may prompt the narrator to re-record that particular section. In some examples, the narrator module 220 may provide the audio data recorded for the section that proceeds the particular section for the user(s) 102 to listen to. This may allow the user(s) 102 to match the volume and tone when re-recording the particular section.

FIG. 4 is a flow diagram of an illustrative process 400 for training the system for voice recognition and performing error detection in audio data associated with the manuscript. The process 400 is described with reference to the system 100 and may be performed by the user device 104 in cooperation with any one or more of the content server(s) 110. Of course, the process 400 (and other processes described herein) may be performed in other similar and/or different environments.

At 402, the manuscript module 114 may receive a script. The manuscripts may be any type of voice recordable content (e.g., books, stories, articles, reports, reading content, etc.) and may be in any format (e.g., eBooks, scanned manuscripts, documents, text files, etc.).

At 404, the script parsing module 210 may analyze script for special words. The script parsing module 210 may parse the manuscript and identify special words in the text of the manuscript. Initially, the script parsing module 210 may analyze the manuscript to identify special words, or words that are unique to the manuscript, thus not words already recorded as part of the general list of calibrating words. Special words may be identified based on appearing above a threshold frequency in the text of the manuscript, such as a predetermined minimum number of appearances in the manuscript, or based on identifying a predetermined top percentage or top number of a unique word list that is ranked by appearances count.

At 406, the calibration module 212 may record the special words. Initially, the calibration module 212 may prompt the user(s) 102 to calibrate the speech-to-text, or speech recognition, algorithm by prompting the user(s) 102 to record a list of calibrating words. This list of calibrating words may be used to train a machine learning model to improve voice and speech recognition for the transcriber module 116. The calibrating words may include a list of commonly used words (e.g., pronouns) and words that the speech recognition algorithm may have identified as being difficult to recognize. Additionally, before transcribing audio data of the manuscript, the calibration module 212 may prompt the user(s) 102 to provide manuscript specific training data by recording special words associated with the current reading assignment. This manuscript specific training data may be added as training data to further train the machine learning model to improve voice recognition.

At 408, the manuscript module 114 may format the script to record. The manuscript module 114 may analyze the manuscript to break the content into chunks and generate a comparison document. The breaks in content may be based on any natural breaks or reading pauses in a manuscript (e.g., paragraph ending, chapter ending, change in story setting, change in timeline, etc.). In various examples, the manuscript module 114 may format the manuscripts into the comparison document without line breaks, paragraph breaks, or punctuations to provide the plain text for a quick text-to-text compare.

At 410, the narrator module 220 may record the script. The narrator module 220 may interact with the presentation module 208 to provide a narrator user interface (UI) for the narrator to receive narrating assignment. The narrator may use the recording tool provided with the narrator UI to record the manuscript, or may use another audio tool for recording, then upload the audio data from the narrator UI. When the narrator is done with the recording process, the narrator may indicate so by stopping the recording session or by selecting the audio data upload option from the narrator UI. In various examples, the narrator module 220 may transmit the recording to the content server(s) 110 for the proofing process. In additional or alternative example, the narrator module 220 may interact with the auditor module 120 to perform the proofing process.

At 412, the transcriber module 116 may receive audio data. The transcriber module 116 may receive and transcribe audio data into text for comparing with the comparison document generated by the manuscript module 114 to identify differences to tag as errors. The script parsing module 210 may parse the manuscript and identify special words. Initially, the script parsing module 210 may analyze the manuscript to identify special words, or words that are unique to the manuscript, thus not words already recorded as part of the general list of calibrating words. Special words may be identified based on appearing above a threshold frequency in the text of the manuscript, such as a predetermined minimum number of appearances in the manuscript, or based on identifying a predetermined top percentage or top number of a unique word list that is ranked by appearances count. In at least some examples, the script parsing module 210 may maintain a list of special words that have been recorded and will filter out special words that have been recorded.

At 414, the transcriber module 116 may transcribe the audio data into text. The speech conversion module 214 may use the system model and audio data generated by the calibration module 212 to convert speech to text. Initially, the early speech conversion module 214 may perform speech-to-text conversion using generic system model and audio data generated by the calibration module 212, then combining natural language parsing and classification to identify speech as words. The natural language parsing may use one or more natural language and homonym libraries. As the studio module 112 produce more tagged and proofed versions of narration data associated with specific user(s)

102, the system model may learn from the narrator specific narration data for particular words.

At 416, the text compare module 216 may analyze the text with respect to the script. The text compare module 216 may interact with the manuscript module 114 and the transcriber module 116 to receive comparison documents and transcribed audio. The text compare module 216 may compare the comparison document of the manuscript with the transcribed audio to identify differences and mark the differences in the transcribed audio file as defects.

At 418, the comparator module 118 may identify one or more defects in the text. The comparator module 118 may include the text compare module 216 and the common errors module 218. The comparator module 118 may flag not only fatal flaws, or any large sections of omitted, added, repeated, or out-of-order content, but also common errors (e.g., consistency, pronunciation, spacing issue, noise, wrong word, etc.). In some examples, the comparator module 118 may determine that one or two common errors are minor to moderate errors and does not rise to level of severity for re-recording. The common errors module 218 may perform a general quality audit and determine if there are common errors in the audio data. Based on the error type and number of errors found, if the common errors module 218 determines that the level of defects for the errors meet a severity threshold, a full audit of the recording may be triggered.

At 420, the comparator module 118 may determine to re-record the portion of the script based on the one or more defects. In various examples, the comparator module 118 may determine that the level of defects does rise to level of severity for re-recording and may provide the recommendation. This may be indicated in either the narrator or auditor tool. If the proofing process determines that a particular section of the recording has a level of defects that meets the severity threshold, the narrator module 220 may prompt the narrator to re-record that particular section. In some examples, the narrator module 220 may provide the audio data recorded for the section that proceeds the particular section for the user(s) 102 to listen to. This may allow the user(s) 102 to match the volume and tone when re-recording the particular section. In various examples, the narrator module 220 may receive the revised recording and may interact with the comparator module 118 to determine that the tone for the revised recording matches the tone in the audio portions before and after the particular section. If the comparator module 118 determines that the volume and tone of the revised recording matches within a threshold degree of similarity, then the revised recording may be inserted into the particular section of the recording. If the comparator module 118 determines the revised recording is defective for volume, tone, or another reason, the narrator module 220 may present the error in the revised recording and request another re-recording.

FIG. 5 is a schematic diagram showing an example user interface 500 for proofer interface (UI) that may be may be presented to a user 102 to review the text-to-text compare. The example user interface 500 may be presented to a user utilizing any communication channel, such as a website associated with the service provider 108, or an application that is associated with the service provider 108 and that resides on device(s) 104 corresponding to the user.

In various examples, the example user interface 500 may include the example proofing tools 502, the example original manuscript 504, and the example tagged transcribed audio 506. The auditor module 120 may interact with the manuscript module 114 and the comparator module 118 to receive the original manuscript and the tagged transcribed audio. The auditor module 120 may interact with the presentation module 208 to present tagged transcribed audio to the proofer via an auditor UI. In the present example, the auditor module 120 presents the example original manuscript 504 and the example tagged transcribed audio 506 next to each other for the proofer verify the defect.

Figure 6:
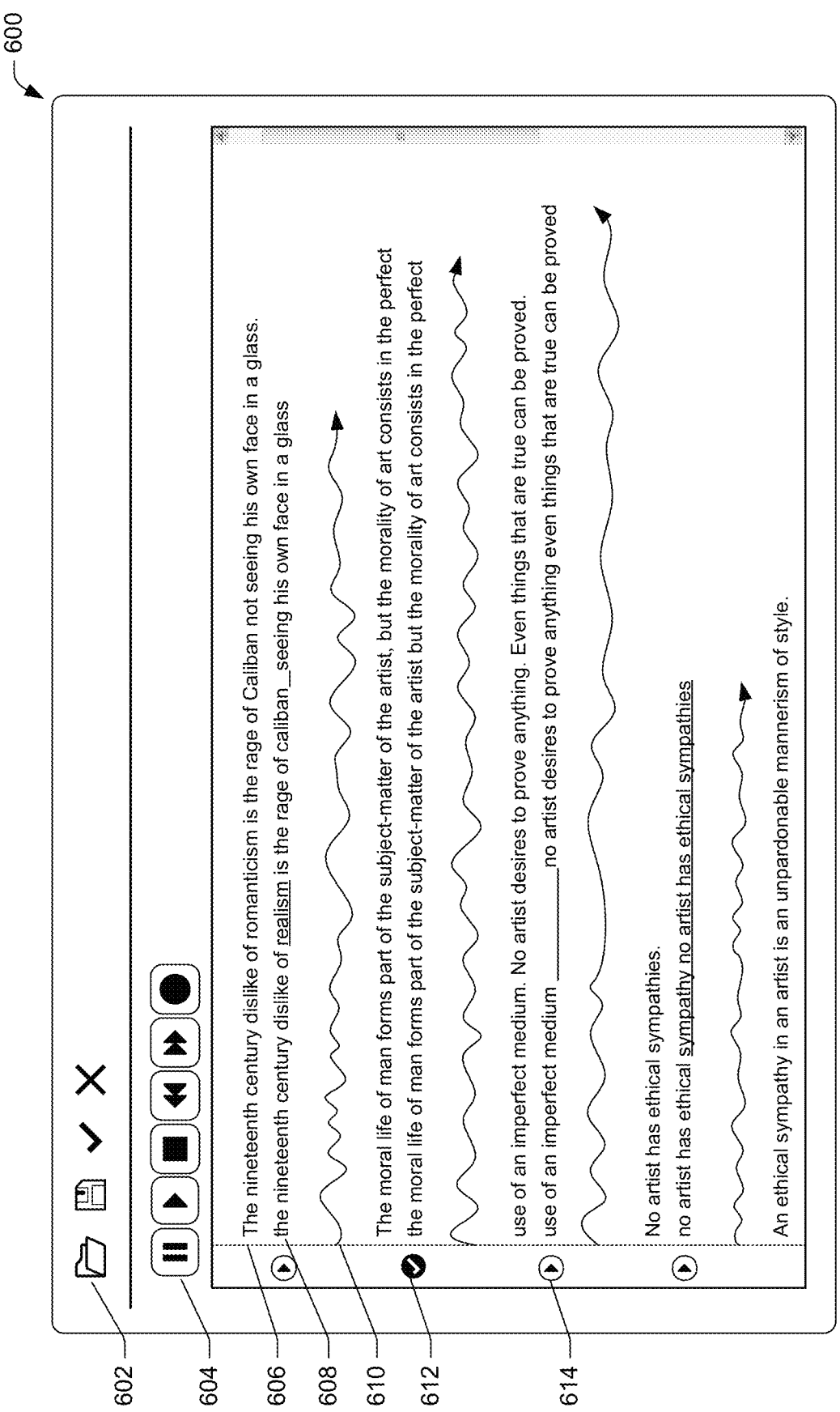
FIG. 6 is a schematic diagram showing an additional example user interface that may be presented to a user to review tagged errors and provide feedback to the system.

FIG. 6 is a schematic diagram showing an example user interface 600 for the proofing tool that may be presented to the user(s) 102 to review tagged errors and provide feedback to the system. The auditor module 120 may cause an auditor UI (e.g. example user interface 600) to be presented to a user(s) 102 utilizing any communication channel, such as a website associated with the service provider 108, a publisher portal, or an application that is associated with the service provider 108 and that resides on device(s) 104 corresponding to the user(s) 102.

As a non-limiting example, the example user interface 600 may include the example proofing tools 602, the example proofing audio tools 604, the example original manuscript 606, the example tagged transcribed audio 608, the example related audio clip 610, the example non-error indicator 612, and the example error indicator 614. The auditor module 120 may interact with the manuscript module 114 and the comparator module 118 to receive the original manuscript and the tagged transcribed audio. The auditor module 120 may interact with the presentation module 208 to present tagged transcribed audio to the proofer via an auditor UI. In the present example, the auditor module 120 presents the example original manuscript 606, the example tagged transcribed audio 608 and the example related audio clip 610 next to each other to help the proofer verify the defect. The proofer may use the example proofing audio tools 604 to trigger the example related audio clip 610 to verify that the error was marked correctly.

Figure 7:
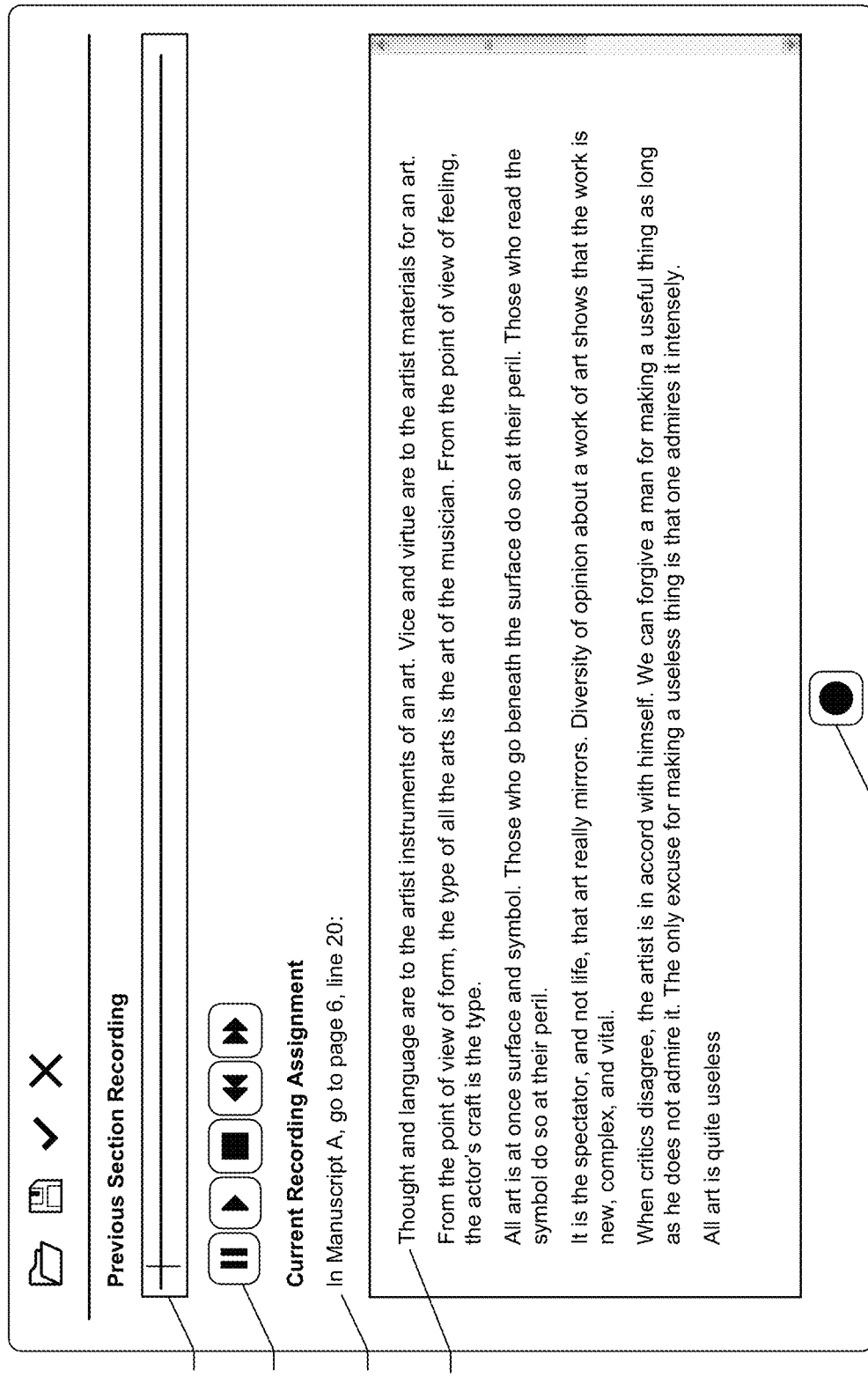
FIG. 7 is a schematic diagram showing an additional example user interface that may be presented to a user to prompt the user to record a manuscript section.

FIG. 7 is a schematic diagram showing an example user interface 700 for a narrator UI that may be presented to the user(s) 102 to listen to recording of a previous section of the manuscript and receive instructions on the current narrating assignment. The narrator module 220 may cause a narrator UI (e.g. example user interface 700) to be presented to a user(s) 102 utilizing any communication channel, such as a website associated with the service provider 108, a publisher portal, or an application that is associated with the service provider 108 and that resides on device(s) 104 corresponding to the user(s) 102.

As a non-limiting example, the example user interface 700 may include example audio data 702, the example narrator tool 704, the example narrator tool 704, the example prompt 706, the example manuscript text 708, and the example recording button 710. In the present example, the proofing process has determined that a particular section of the recording has errors that meets the severity threshold, the narrator module 220 includes the example prompt 706 for the narrator to re-record that particular section. The narrator module 220 has provided the example audio data 702 recorded for the section that proceeds the particular section for the user(s) 102 to listen to, along with the example narrator tool 704 to trigger the audio. This may allow the user(s) 102 to match the volume and tone when re-recording the particular section. The narrator may use the example recording button 710 provided with the narrator UI to record the example manuscript text 708, or may use another audio tool to record, then upload the audio data from the narrator UI. When the narrator is done with the recording process, the narrator may indicate so by stopping the recording session or by selecting audio data upload from the narrator UI.

FIG. 8 is a flow diagram of an illustrative process 800 for the continuous feedback loop of presenting a script to record, performing error detection in audio data associated with the script, and determining whether to move onto new script or re-record the script based on defect. The process 800 is described with reference to the system 100 and may be performed by the device(s) 104 in cooperation with any one or more of the content server(s) 110. Of course, the process 800 (and other processes described herein) may be performed in other similar and/or different environments, and the continuous feedback loop may be stopped during any step of the process 800.

At 802, the narrator module 220 may present the script to record. The narrator module 220 may interact with the presentation module 208 to provide a narrator user interface for the narrator to receive narrating assignment. When the narrator is done with the recording process, the narrator may indicate so by stopping recording session or by selecting audio data upload from the narrator UI. In various examples, the narrator module 220 may transmit the recording to the content server(s) 110 for the proofing process. In some examples, the narrator module 220 may interact with the auditor module 120 and initiate the proofing process.

At 804, the narrator module 220 may record the script. As described above, the narrator module 220 may interact with the presentation module 208 to provide a narrator user interface for the narrator to receive narrating assignment. The narrator may use recording tool provided with the narrator UI to record the manuscript, or may use another audio tool to record, then upload the audio data from the narrator UI. When the narrator is done with the recording process, the narrator may indicate so by stopping recording session or by selecting audio data upload from the narrator UI. In various examples, the narrator module 220 may transmit the recording to the content server(s) 110 for the proofing process. In some examples, the narrator module 220 may interact with the auditor module 120 and initiate the proofing process.

At 806, the transcriber module 116 may receive audio data. The transcriber module 116 may receive and transcribe audio data into text for comparing with the comparison document generated by the manuscript module 114 to identify differences to tag as errors. The script parsing module 210 may parse the manuscript and identify special words. Initially, the script parsing module 210 may analyze the manuscript to identify special words within the manuscript. Special words may be identified based on some minimum number of appearance in the manuscript, or based identifying some top percentage of a ranked word count list. In at least some examples, the script parsing module 210 may maintain a list of special words that have been recorded and will filter out special words that have been recorded.

At 808, the transcriber module 116 may transcribe the audio data into text. The speech conversion module 214 may use the system model and audio data generated by the calibration module 212 to convert speech to text. Initially, the early speech conversion module 214 may perform speech-to-text conversion using generic system model and audio data generated by the calibration module 212, then combining natural language parsing and classification to identify speech as words. As the studio module 112 produce more tagged and proofed versions of narration data associated with specific user(s) 102, the system model may learn from the narrator specific narration data for particular words.

At 810, the text compare module 216 may analyze the text with respect to the script. The text compare module 216 may interact with the manuscript module 114 and the transcriber module 116 to receive comparison documents and transcribed audio. The text compare module 216 may compare the comparison document of the manuscript with the transcribed audio to identify differences and mark the differences in the transcribed audio file as defects.

At 812, the comparator module 118 may identify defect(s). The comparator module 118 may include the text compare module 216 and the common errors module 218. The comparator module 118 may flag not only fatal flaws, or any large sections of omitted, added, repeated, or out-of-order content, but also common errors (e.g., consistency, pronunciation, spacing issue, noise, wrong word, etc.). In some examples, the comparator module 118 may determine the level of defects for a particular recorded section or session based on the number of errors and the type of errors. Certain error types may increase the weight of the error in determining the level of defects. For instance, an incorrect pronunciation of the name of a character may weigh more heavily than an incorrect pronunciation of an adjective. Thus, the level of defects based on two instances of mispronunciation of character names may be higher than four instances of mispronunciation of adjectives. In an additional example, the comparator module 118 may determine that one or two common errors are minor to moderate errors and may not rise to a level of severity for re-recording. That is, the comparator module 118 may recommend accepting the recording with the one or two common errors, based on the level of defect in the recording being within a threshold margin of error. In various examples, the comparator module 118 may determine that the level of defects associated with errors is below the threshold margin of error for re-recording and may provide the recommendation accordingly. The recommendation may be indicated in either the narrator or auditor tool.

At 814, if there were no defect(s) found in the transcribed text in process 812, the narrator module 220 may identify a new script to record. When the narrator is done with the recording process, the narrator may indicate so by stopping recording session or by selecting audio data upload from the narrator UI. In various examples, the narrator module 220 may transmit the recording to the content server(s) 110 for the proofing process. In some examples, the narrator module 220 may interact with the auditor module 120 and initiate the proofing process. If the proofing process finds no error, the narrator may receive follow up narrating assignment. If all sections of the present manuscript have been recorded, the process may stop here, or the narrator may continue this process by requesting a new narrating assignment with a new manuscript.

At 816, if there were defect(s) found in the transcribed text in process 812, the auditor module 120 may present feedback on the defect(s). The auditor module 120 may interact with the manuscript module 114 and the comparator module 118 to receive the original manuscript and the tagged transcribed audio. In various examples, the auditor module 120 may interact with the presentation module 208 to present tagged transcribed audio to the proofer via an auditor UI. The auditor module 120 may also present an audio tool to play the audio associated with the defective portion for verification.

At 818, the auditor module 120 may receive input on whether the defect(s) was correctly identified. In various examples, the auditor module 120 may interact with the presentation module 208 to present tagged transcribed audio to the proofer via an auditor UI. The auditor module 120 may present the original manuscript and the tagged transcribed audio next to each other to help the proofer verify the defect. In some examples, the auditor module 120 may present audio playing options for a proofer to listen to the audio data to verify the errors and may present editing tools to accept or reject the errors tags.

At 820, the auditor module 120 may save incorrectly identified defect(s) as training data. If the auditor module 120 receives input from user to a reject false positive error, the associated narration data may be marked as having a false positive error may be stored in data store 222 to be used to train the system to not continuously make the same false positive error.

At 822, the comparator module 118 may determine if the defect(s) exceeds a threshold. The comparator module 118 may include the text compare module 216 and the common errors module 218. The comparator module 118 may flag not only fatal flaws, or any large sections of omitted, added, repeated, or out-of-order content, but also common errors (e.g., consistency, pronunciation, spacing issue, noise, wrong word, etc.). In some examples, the comparator module 118 may determine that some common errors or minor errors do not rise to level of severity to justify re-recording. The common errors module 218 may perform a general quality audit and determine if there are common errors in the audio data. Based on the error type and number of errors found, if the common errors module 218 determines that the errors meet a severity threshold, a full audit of the recording may be triggered. For instance, as discussed above with respect to the common errors module 218, a threshold for incorrect words may be 5 or more incorrect words for a recording session.

At 824, the comparator module 118 may select a portion of the script to re-record. In various examples, the comparator module 118 may determine that the errors are does rise to level of severity for re-recording and may provide the recommendation. This may be indicated in either the narrator or auditor tool. If the proofing process determines that a particular section of the recording has errors that meets the severity threshold, the narrator module 220 may prompt the narrator re-record that particular section. In some examples, the narrator module 220 may provide the audio data recorded for the section that proceeds the particular section for the user(s) 102 to listen to. This may allow the user(s) 102 to match the volume and tone when re-recording the particular section.

At 826, the narrator module 220 may receive revised audio data of the portion of the script. In various examples, the narrator module 220 may receive the revised recording and may interact with the comparator module 118 to determine that the tone for the revised recording matches the tone in the audio portions before and after the particular section. If the comparator module 118 determines that the volume and tone of the revised recording matches with an accepted degree of similarity, then the revised recording may be insert into the particular section of the recording. If the comparator module 118 determines the revised recording is defective for volume, tone, or another reason, the narrator module 220 may present the error in the revised recording and request another re-recording.

At 828, the narrator module 220 may insert revised audio data into the audio data. As discussed in process 826, if the comparator module 118 determines that the volume and tone of the revised recording matches with an accepted degree of similarity, then the revised recording may be insert into the particular section of the recording. In an additional or alternative example, the narrator module 220 may include a stitching tool for inserting revised recording. If the comparator module 118 determines the revised recording is defective for minor volume or tone differences, the narrator module 220 may include an auto-tuning option can make small adjustments to the revising recording. Accordingly, if the comparator module 118 determines that the volume and tone of the auto-tuned revised recording matches with an accepted degree of similarity, then the auto-tuned revised recording may be insert into the particular section of the recording.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
memory storing computer-executable instructions that, when executed, cause the one or more processors to perform operations comprising:
receiving text of a manuscript to be narrated by a person;
calibrating a speech-to-text algorithm, the calibrating including:
analyzing the text of the manuscript to identify one or more special words, the one or more special words including one or more words appearing equal to or greater than a threshold frequency in the text of the manuscript;
generating a user interface to present the one or more special words to be narrated by the person;
receiving training audio data corresponding to the one or more special words; and
training, using the training audio data, one or more machine learning models to perform speech recognition;
causing the user interface to present the manuscript to be narrated by the person;
receiving audio data of a narration of the manuscript by the person;
transcribing the audio data using at least the speech-to-text algorithm and a natural language understanding algorithm to create comparison text;
analyzing the comparison text with respect to the text of the manuscript to identify one or more differences in at least one word;
tagging the one or more differences between the comparison text and the text of the manuscript as one or more defects;
causing the user interface to present the comparison text including the tagging of the one or more defects;
receiving user input to accept at least one of the one or more defects; and
determining to re-record a portion of the manuscript based at least in part on the user input.

2. The system as recited in claim 1, the operations further comprising:
receiving a second user input to reject a false positive in the one or more defects; and
storing the comparison text including the second user input to reject the false positive as training data.

3. The system as recited in claim 1, the operations further comprising:
  causing to present the portion of the manuscript for narration;
  receiving new audio data corresponding to the portion of the manuscript; and
  analyzing the new audio data with respect to the audio data for tone change.

4. A computer-implemented method, comprising:
  receiving a manuscript to be read by a reader;
  calibrating a speech-to-text algorithm based at least in part on words spoken by the reader, the calibrating including:
    analyzing the manuscript for one or more special words, the one or more special words including one or more words appearing equal to or greater than a threshold frequency in the manuscript;
    receiving training audio data associated with the one or more special words; and
    training a machine learning model to perform speech recognition using the training audio data;
  receiving audio data associated with a reading of the manuscript by the reader;
  transcribing the audio data to text using the speech-to-text algorithm;
  analyzing the text with respect to the manuscript;
  identifying one or more defects in the text, the one or more defects including one or more differences in at least one word between the text and the manuscript;
  generating tagged narration data corresponding to the text, the tagged narration data indicating the one or more defects; and
  causing a user interface to present the tagged narration data.

5. The computer-implemented method as recited in claim 4, further comprising receiving user input to reject a defect in the tagged narration data via the user interface.

6. The computer-implemented method as recited in claim 4, further comprising:
  retraining the machine learning model using the tagged narration data.

7. The computer-implemented method as recited in claim 4, further comprising generating the user interface to present the tagged narration data, the user interface including an audio control to playback at least a portion of the audio data.

8. The computer-implemented method as recited in claim 7, further comprising:
  receiving user input to reject the one or more defects; and
  storing the tagged narration data including the user input to reject the one or more defects as training data.

9. The computer-implemented method as recited in claim 4, further comprising:
  generating a user interface to present the tagged narration data;
  receiving user input to accept the one or more defects; and
  identifying a portion of the manuscript corresponding to a location of the one or more defects.

10. The computer-implemented method as recited in claim 9, further comprising:
  presenting, in the user interface, the portion of the manuscript corresponding to the location of the one or more defects; and
  presenting, in the user interface, a prompt to re-record the portion of the manuscript.

11. A system, comprising:
  one or more processors; and
  memory storing computer-executable instructions that, when executed, cause the one or more processors to perform operations comprising:
    calibrating a speech-to-text algorithm, the calibrating including:
      analyzing a manuscript for one or more special words, the one or more special words including one or more words appearing equal to or greater than a threshold frequency in the manuscript;
      receiving training audio data associated with the one or more special words; and
      training a machine learning model to perform speech recognition using the training audio data;
    receiving audio data corresponding a portion of the manuscript;
    transcribing the audio data to text using the speech-to-text algorithm;
    analyzing the text with respect to the portion of the manuscript;
    identifying one or more differences between the text and the portion of the manuscript as one or more defects in the text; and
    causing a user interface to present the one or more defects in the text.

12. The system as recited in claim 11, the operations further comprising receiving feedback to confirm a defect of the one or more defects in the text via the user interface.

13. The system as recited in claim 11, the operations further comprising:
  analyzing the audio data for an additional defect, the additional defect further includes at least one of pronunciation, spacing issue, or noise; and
  determining to re-record the portion of the manuscript based at least in part on identification of the additional defect.

14. The system as recited in claim 11, the operations further comprising:
  generating the user interface to present the one or more defects in the text; and
  distinguishing the one or more defects in the user interface from other words in the text.

15. The system as recited in claim 14, the operations further comprising presenting, in the user interface, the portion of the manuscript corresponding to the one or more defects in the text.

16. The system as recited in claim 14, the operations further comprising:
  receiving a first user input to reject a first defect of the one or more defects; and
  receiving a second user input to accept a second defect of the one or more defects.

17. The system as recited in claim 16, the operations further comprising:
  determining to re-record the portion of the manuscript based at least in part on the second user input; and
  presenting the portion of the manuscript for narration.

18. The system as recited in claim 16, the operations further comprising storing narration data including the audio data, the text, the one or more defects, and the first user input to reject the first defect.

19. The system as recited in claim 18, the operations further comprising:
  retraining the machine learning model using the narration data.

20. The computer-implemented method as recited in claim 4, further comprising:
- receiving a second manuscript to be read by the reader;
- analyzing the second manuscript for additional special words, the additional special words including words appearing in the second manuscript and not previously recorded for the training audio data;
- receiving additional training audio data associated with the additional special words; and
- retraining the machine learning model using the additional training audio data.

\* \* \* \* \*